Nov. 19, 1968    A. KERNICK    3,412,316
CONTROL CIRCUITRY FOR POWER INVERTER APPARATUS
Filed Dec. 1, 1966    2 Sheets-Sheet 1

Nov. 19, 1968  A. KERNICK  3,412,316
CONTROL CIRCUITRY FOR POWER INVERTER APPARATUS
Filed Dec. 1, 1966  2 Sheets-Sheet 2

WITNESSES:

INVENTOR
Andress Kernick
BY
ATTORNEY

United States Patent Office 3,412,316
Patented Nov. 19, 1968

3,412,316
CONTROL CIRCUITRY FOR POWER
INVERTER APPARATUS
Andress Kernick, Lima, Ohio, assignor to Westinghouse
Electric Corporation, Pittsburgh, Pa., a corporation of
Pennsylvania
Filed Dec. 1, 1966, Ser. No. 598,460
9 Claims. (Cl. 321—45)

ABSTRACT OF THE DISCLOSURE

This disclosure describes power inverter apparatus including a power stage utilizing a pair of power switching devices, such as transistors, which alternately conduct to supply the output of the inverter. A biasing circuit including a storage element, such as a capacitor, is connected to the pair of power devices. A steering circuit including a pair of switching devices, such as transistors, is provided, with a transformer coupling the steering circuit to the power stage. Respective windings of the transformer are connected to the device of the power stage and steering circuit. A pilot circuit is provided to control the conductive state of the steering devices. The turning on of one of the steering devices instigates turn-off of the previously conductive power device. The biasing circuit completes turn-off by reverse biasing the turning off power device. The other power device is maintained non-conductive until the turning off power device is rendered non-conductive.

---

The present invention relates to control circuitry for power inverter apparatus and, more particularly, to control circuitry for power inverter apparatus using semiconductor switching devices.

A highly useful control system for power inverter apparatus is disclosed in copending application Ser. No. 284,961, filed June 3, 1965, now Patent No. 3,305,761, by Andress Kernick and Theodore M. Heinrich, and assigned to the same assignee as the present application. In the cited application, a pair of power transistors of the inverter are controlled through circuitry including a steering circuit having a pair of transistors and a control transformer. To switch the power branches of the inverter from one power transistor to the other, a transistor of the steering circuit is turned on which provides a shorting loop for the base-emitter circuit of the conductive power transistor to effect its turn-off. The steering circuit and the control transformer prevents the other power transistor from becoming conductive until the first power transistor has substantially ceased to conduct, thus preventing a short circuit across the inverter output. A limitation of the above-described system is that the turning off of the power transistor is accomplished by shorting its base circuit. In actuality, a slight forward drop appears across the base emitter circuit during turn-off. This, of course, is not the most effective way of turning off a power transistor as compared to reverse biasing the base-emitter circuit thereof.

Also, in the above-described system, it is required that "wing-windings" on the output transformer or base circuit threshold diodes be employed to prevent, under certain conditions, one of the power transistors from being turned on in its reverse direction. This may cause an unbalanced volt-second condition on the power transformer producing undesired magnetic saturation thereof. It would, moreover, be very desirable to provide inverter apparatus having the capability of supplying unbalanced loads, i.e., nonlinear loads which present a different impedance during opposite half-cycles of operation. If the inverter system is to supply a nonlinear load and does not have the capability of supplying such a load, undesired magnetic saturation may also occur in the inverter apparatus.

It is therefore an object of the present invention to provide new and improved control circuitry for inverter apparatus.

It is a still further object to provide new and improved control circuitry for power inverter apparatus wherein the power transistors thereof are tuned off by the e-vese-biasing thereof.

It is a still further object to provide new and improved control circuitry for power inverter apparatus wherein one of the conducting power transistors is rendered nonconductive before the other is rendered conductive with the turning off of the conductive transistors being effected by the reverse-biasing thereof.

It is a further object to provide new and improved control circuitry for power inverter apparatus which is capable of supplying nonlinear loads without magnetic saturation and which utilizes a minimum of components.

The above-cited objects are accomplished by providing new and improved control circuitry for power inverter apparatus wherein: the power transistors of the inverter apparatus are controlled through circuitry including a steering circuit and a control transformer, with a shorting loop being provided in the steering circuit to instigate turn-off of the conductive one of the power transistors. A biasing circuit including a storage element is provided which completes the turn-off of the turning off power transistor by the reverse-biasing thereof. The turn-off of the other power transistor is accomplished through the operation of the steering circuit and control transformer when the conduction of the first power transistor has substantially terminated to effect electrical interlock. In other embodiments nonlinear loads may be handled by the use of separate control transformers and use of control devices in the steering circuitry.

These and other objects and advantages of the present invention will become more apparent when considered in view of the following specification and drawing in which.

Figure 1:
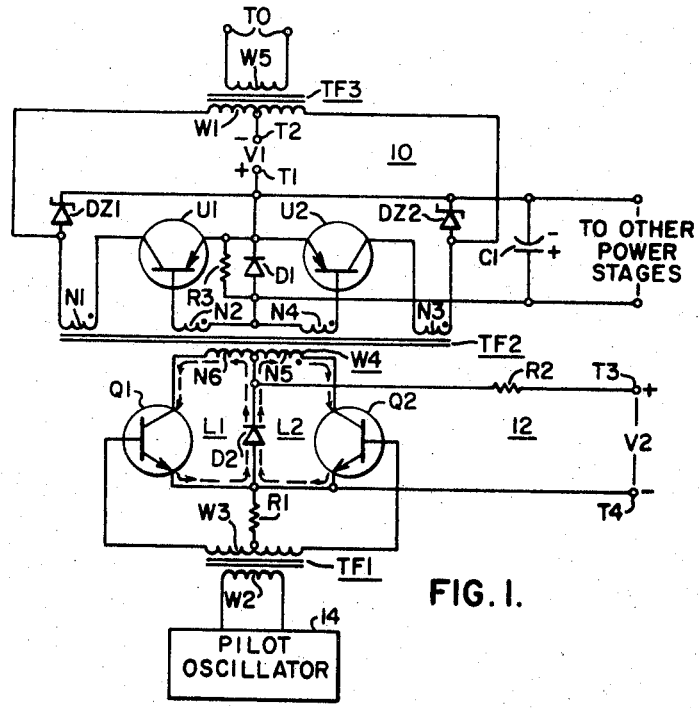
FIGURE 1 is a schematic diagram of one embodiment of the present invention.

Referring now to FIG. 1, inverter apparatus is shown including a power stage 10 having power transistors U1 and U2 contained therein; a steering stage 12 having a pair of steering transistors Q1 and Q2 included therein; and a pilot oscillator 14 which supplies a square-wave output for controlling the conductive state of the steering transistors Q1 and Q2. A transformer TF1 couples the pilot oscillator 14 to the steering stage 12; a transformer TF2 couples the steering stage 12 to the power stage 10 and a transformer TF3 couples the power stage 10 to output terminals T0, from which the alternating output of the inverter apparatus is taken.

Assume that the power transistor U1 is conducting. Thus, a current path is provided from a terminal T1, at the positive terminal of a direct current source V1, not shown, through the emitter-collector circuit of the transistor Q1, a feedback winding N1, a primary winding W1 of the power transformer TF3, to a center tap terminal T2, which is connected at the negative end of the D.C. source V1. The base drive for the transistor U1 is supplied by current transformer positive feedback through the use of the feedback winding N1 and a base-drive winding N2. The winding N2 has its undotted end connected to the base electrode of the power transistor U1 and its dotted end connected through the anode-cathode circuit of a diode D1 to the emitter of the transistor U1. The dotted end of the feedback winding N1 being coupled to the collector electrode of the transistor U1 and the undotted end of the N2 being connected to the base thereof, provide the proper polarity drive voltage for the transistor U1 in response to the conduction of the power transistor U1. At this time, the steering transistor Q1 is also conductive being supplied with base drive from the pilot oscillator 14, through a primary winding W2 of the transformer TF1, through the secondary winding W3 thereof, which has its dotted end connected to the base of the transistor Q1 and its undotted end connected to the base of the transistor Q2. A center tap point of the secondary winding W3 is connected through a resistor R1 to the emitter electrodes of the transistors Q1 and Q2. During this time interval, the other steering transistor Q2 is blocking a D.C. voltage V2, which is applied between a pair of terminals T3 and T4, with the terminal T3 being positive. The terminal T3 is connected through a resistor R2 to the center tap junction of a winding W4 of the transformer TF2. The winding W4 has two portions, a winding N5 and a winding N6. The dotted end of the winding N5 is connected to the collector of the transistor Q2 and the undotted end of the winding N6 is connected to the collector of the transistor Q1. The transistor Q2 in its nonconductive state thus blocks the D.C. voltage V2 and also blocks the induced voltage which appears across the winding N5.

The power transistor U2 has its emitter electrode connected to the emitter electrode of the other power transistor U1 and has its collector electrode coupled through a feedback winding N3 to the end of the winding W1 of the transformer TF3. A base drive winding N4 is coupled between the cathode of the diode D1 and the base of the power transistor U2, with the dotted end of the winding N4 being connected to the base electrode of the transistor U2. Thus, during the time under consideration, the power transistor U2 is blocking the voltage V1 as well as the voltage induced in the winding W1 between the center tap and right end thereof. Also during this time interval the power transistor U2 is reversed-biased by a voltage equal in magnitude to the forward drop of the emitter-base junction of the transistor U1 plus twice the forward drop of the diode D1, since the voltage induced in the winding N4 is equal to the base-emitter drop of the transistor U1 plus the forward threshold drop of the diode D1.

Base drive current for the transistor U1 flows in a circuit including the emitter-base circuit of the transistor U1, the winding N2 and the diode D1. The flow of current through the diode D1 is such that the threshold drop of the diode D1 establishes a biasing voltage across a capacitor C1 which is connected directly across the diode D1. The polarity of this voltage is indicated on FIG. 1. A resistor R3 is also connected directly across the diode D1 and establishes base clamping for the transistors U1 and U2 prior to start-up of the apparatus. The diode D1, the capacitor C1 and resistor R3 thus form a biasing network for developing a reverse bias voltage having a polarity as shown which is used in the turning off of the power transistor U1 and U2 as will be described.

The turn-off of the power transistor U1 is initiated by the phase reversal of the output of the pilot oscillator 14, which causes the base drive for the transistors Q1 and Q2 to reverse with the transistor Q1 now being turned off and the transistor Q2 being turned on. The conduction of the transistor Q2 thus completes a circuit path through the collector-emitter circuit thereof, the anode-cathode circuit of a diode D2, which is connected between the emitter electrodes of the transistors Q1–Q2 and the center tap point of the winding N4, and the winding N5 to the collector of the transistor Q2. The loop designated by the arrow L2 indicates the direction of current flow through the winding N5. The dot convention between the winding N5 and the winding N2 is such that the base drive voltage appearing across the winding N2 is in a direction to tend to turn off the transistor U1. The conduction of current through the winding N5 from the undotted to the dotted end thereof essentialy short circuits the emitter-base circuit of the transistor U1 tending to turn off the transistor U1, with reverse current being forced through the transistor U1 from base to emitter caused by capacitor C1 beginning to discharge with carriers in the transistor U1 being swept out. However, a plus-to-minus drop from emitter-to-base is maintained across the junction of the transistor U1 during the storage-time thereof. The shorting loop L2 has the emitter-base voltage drop of the transistor U1 reflected into the winding N5 with the dot end thereof being positive. Additional voltage drops appear in the loop L2 due to the resistance of the winding N5, the drop across the diode D2 and the drop across the transistor Q2. The sum of these voltage drops is induced in the base drive winding N4 of the transistor U2 with the dot on the winding N4 also being positive. This potential across the winding N4 plus the voltage on the capacitor C1 prevents the transistor U2 from becoming conductive at this time. This is thus an electrical interlock action with the previously non-conductive transistor U2 being prevented from being conductive, while the other power transistor U1 is still in a conductive state.

At the instant the carrier sweep-out ends for the power transistor U1 this transistor is reverse-biased between base and emitter by the remaining charge voltage on the capacitor C1. The collector current in the transistor U1 is thereby forced to fall by the reverse-bias provided by the capacitor C1 in addition to the shorted base action effected by the turning on of the transistor Q2. With the collector current of the transistor U1 decreasing, the current induced in the winding N5, induced therein via the windings N1 and N2, also decreases to a point where the forward current through the diode D2 is overcome by the current in the reverse direction from the resistor R2 to cause the diode D2 to block the forward passage of current therethrough. When this occurs, the delay time for the turning on of the transistor U2 begins. The electrical interlock feature is such that a switching overlap between the power transistors both being conductive during the storage time of the off-going transistor is prevented. Since storage time is not a fixed value and may vary, the present scheme accommodates a precise interlock action.

In most instances an inductive load is placed across the output terminals T0 of the output winding W5 of the transformer TF3. Because of the inductive load, it is necessary that a return path be provided between the transistor U1 and the D.C. source V1 to transfer energy back into the D.C. source. To provide the return current path to the D.C. source, a commutating Zener diode DZ1 is connected between the emitter electrode at the plus terminal T1 of the power transistor U1 and the left end of the winding W1, and a Zener diode DZ2 is connected between the emitter electrode of the transistor U2 at the terminal T1 and the right end of the winding W1. The cathode-electrodes of each of the Zener diodes DZ1 and DZ2 are connected to the emitter electrodes and the anode-electrodes thereof are respectively connected to the ends of the winding W1. Thus, as the power transistor U1 is being turned off the commutating Zener diode DZ2 provides a current path therethrough back into the D.C. source V1, and, when the transistor U2 is being turned off, during the next half-cycle, the Zener diode DZ1 provides a current path back into the D.C. source V1.

The presence of the bias capacitor C1 prevents the base circuit of the transistor U2 from stealing forward current from the commutating diode DZ2. If sufficient current were supplied to the transistor U2, this could cause the transistor U2 to be turned on in a reverse direction, but at a gain substantially lower than its normal forward gain. Control over the inverter circuit would thus become unstable because the steering transistor Q2 would then be unable to keep the transistor U1 from tending to come back on. Unbalanced volt-second condition on the power transformer TF3 could thus result and introduce undesired magnetic saturation thereof. In the above-cited copending application, it was necessary to either use base circuit threshold diodes for the power transistors or to utilize "wing-windings" on the power transformer to prevent the transistor U2 from drawing current from the commutating diodes. However, as shown in FIG. 1 the use of the biasing capacitor C1 prevents the transistor U2 from stealing current and being turned on in its reverse direction. The current drawn through the Zener diode DZ2 increases as a function of the load power factor.

After the transistor U1 has been turned off, the transistor U2 is rendered conductive in the following manner. Current is supplied from the V2 source from the plus terminal T3, through the resistor R2 into the winding N5 and the collector emitter circuit of transistor Q2. As previously mentioned, the diode D2 is in a blocking state when the current in loop L2 drops to a low level. As can be seen by dot convention established between the windings N5 and N4, the transistor U2 will be so biased therethrough to be placed in a conductive condition. The conduction of the transistor U2 will build up through the positive current feedback action of the feed back winding N3 and the base-drive winding N4 so that the base drive for the transistor U2 is increased to establish the desired collector current therethrough. With the transistor U2 conducting, the capacitor C1 charges to the forward threshold level of the diode D1 to reset the bias circuit for the next half-cycle of operation when the transistor U2 is turned off and the transistor U1 is turned on.

During the next half-cycle of operation, which is initiated by the pilot oscillator 14 to turn on the transistor Q1 and turn off the transistor Q2, the operation of steering circuit and control and power circuit is substantially identical as described, however, with the correlative functions taking place for each of the transistors and windings as described above. A shorting loop L1 is provided through the diode D2, the winding N6 and the collector-emitter circuit of the transistor Q1 to instigate the turnoff of the transistor U1.

As indicated on the drawing, the biasing circuit including the capacitor C1, the diode D1 and the resistor R3 can be utilized to act as a reverse-biasing circuit for a number of other power stages in a complete array of inverter stages to provide a composite output. The other power stages would be controlled by their individual steering circuits wherein the steering transistors thereof would be turned on and off at the appropriate times to provide the desired composite output. It should also be noted that NPN power transistors could be utilized rather than PNP types as shown with the reversal of polarity for the DC source V1, the diode D1 and the Zener diodes DZ1 and DZ2.

Figure 2:
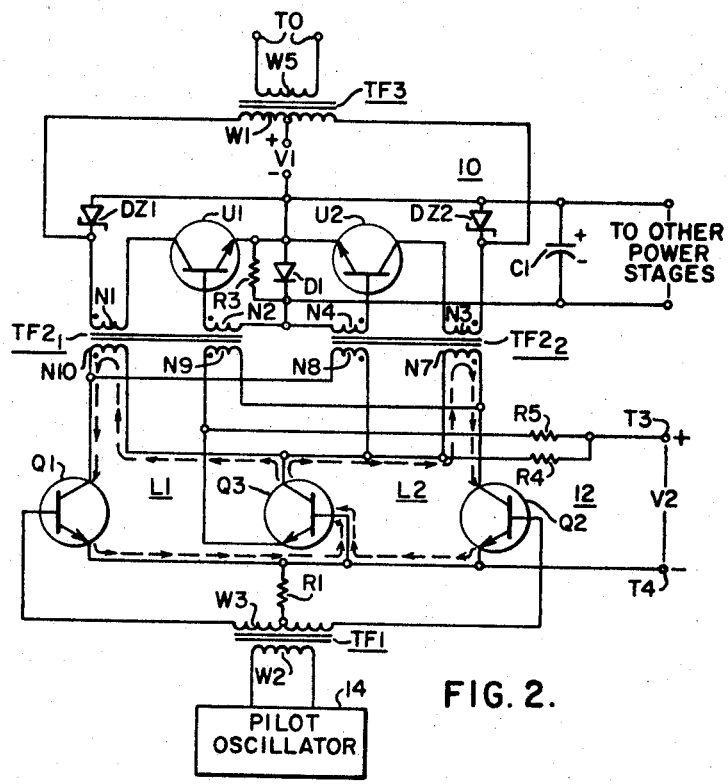
FIG. 2 is a schematic diagram of another embodiment.

FIG. 2 shows an embodiment of the present invention wherein the power transistors U1 and U2 are of the NPN type with the polarity of the DC source V1, the diode D1 and the Zener diodes DZ1 and DZ2 being reversed as shown. Moreover, separate cores are provided for each of the power transistors U1 and U2 so that a transformer $TF2_1$ and a transformer $TF2_2$ are provided, respectively, for the power transistors U1 and U2 replacing the transformer TF2. The use of the separate cores permits a nonliner load to be connected across the output winding W5 at the terminals T0. Such a load might, for example, comprise a resistor and a diode. The nonlinear nature of the load during consecutive half-cycles of the operating frequency of the inverter will result in the magnetic saturation of various transformers of the inverter if only one core is utilized. However, in the embodiment shown in FIG. 2, the cores operate in alternate half-cycles where one half-cycle acts to provide base drive for the associated power transistor and the other half-cycle acts as the resetting half-cycle for that particular core.

Figure 3:
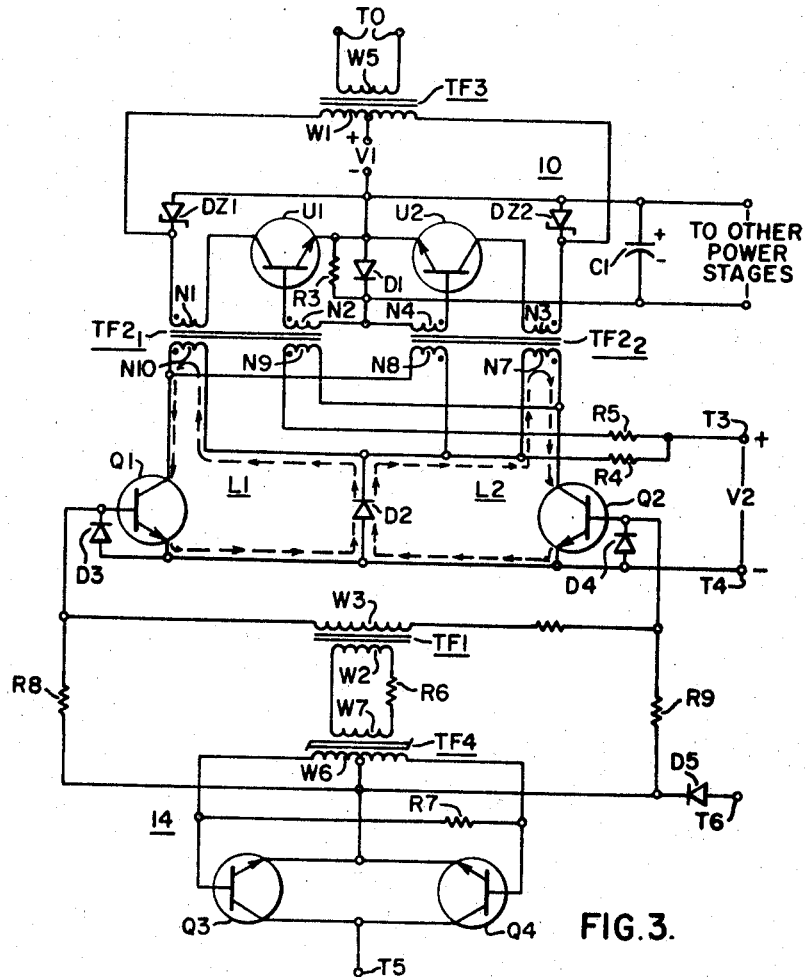
FIG. 3 is a schematic diagram of another embodiment.

The power stage 10 as shown in FIG. 3 is substantially the same as that indicated in FIG. 2. However, the steering stage 12 includes a third transistor Q3 and four windings N7, N8, N9 and N10. The windings N7 and N8 and the windings N3 and N4 are associated with the transformer $TF2_2$, and the windings N9 and N10, N1 and N2 are associated with the transformer $TF2_1$. In the steering circuit 12 the transistor Q2 replaces the diode D2 of FIG. 1 and operates in a rather unusual mode. This can be noted by the arrows L1 and L2. These shorting loops both run through the base-collector diode of the transistor Q3. For the transistor Q3 to operate in this mode, it is necessary that the emitter-base capability be relatively large, for example of the order of 35 volts or greater.

Assuming that the transistor U2 and the transistor Q1 are conductive, it is intended that the transistor U2 be turned off. The transistor Q2 is thus turned on by the pilot oscillator 14 and the transistor Q1 is turned off. A shorting path L2 is provided, as shown, including the base-emitter circuit of the transistor Q3, the winding N7 and the collector-emitter circuit of the transistor Q2. Thus, through transformer action of the windings N7 and N4, the transistor U2 is ready to be turned off. As the voltage induced in the winding N4 is applied in a direction to tend to turn this transistor off, the capacitor C1 then begins to discharge through the emitter-base circuit of the transistor U2 to sweep-out the carriers therein as previously described. The collector of the transistor Q3 is connected through a resistor R4 to the positive terminal T3 of the V2 source. The emitter of the transistor Q3 is connected through a resistor R5 to the positive terminal T3 of the V2 source. The winding N9 is connected between the collector of the transistor Q2 and the emitter of the transistor Q3. Thus, as the transistor Q3 provides a backward circuit path between emitter and collector, the current through resistor R5 from source V2 is diverted from winding N9 so that base drive is not initiated in power transistor U1 because of the electrical interlock action. When the collector current of the transistor U2 drops, the base-collector diode of the transistor Q3 will block and a current path is provided from the V2 source, through the resistor R4, the winding N7 and the collector-emitter circuit of the transistor Q2. This thus resets the magnetic state of the core of the transformer $TF2_2$. The power transistor U1 has been maintained in a nonconductive state due to the electrical interlock action of backward current through transistor Q3. However, with the unclamping of base-collector diode of the transistor Q3, a current path is then permitted through the winding N9 through a resistor R5, which has one end connected to the positive terminal T3 of the DC source V2 and the other end connected to the dotted end of the winding N9. The undotted end of winding N9 is connected to collector of the transistor Q2. Base drive is then provided for initiating the turning on of the transistor U1, with a current path being provided from the positive terminal T3 of the DC source V2, through the resistor R5, the winding N9, and the collector-emitter circuit of the transistor Q2. The polarity of the current provided through the winding N9 is such to induce a voltage to turn on the transistor U1. The turning on of the transistor U1 provides current to feedback windings N1 and by current transformer action builds up the base drive via winding N2 to sustain the collector current at the desired operating level.

On the next half-cycle of the operation of the inverter, the transistor Q1 is turned on and the transistor Q2 is turned off. A shorting loop L1 is provided through the base-collector circuit of the transistor Q3, the winding N10 and the collector-emitter circuit of the transistor Q1. The transistor U1 will thus be turned off. When the collector current drops to a low value, the base-collector diode of the transistor Q3 will unclamp to permit current flow through the resistor R4 and the winding N10 from the V2 source and the collector-emitter circuit of the transistor Q1 to reset the winding $TF2_1$. Start-up base drive will be provided for the transistor U2 from the V2 source through the resistor R5, the winding N8, and the collector-emitter circuit of the transistor Q1 after transistor Q3 again blocks emitter-collector conduction. Due to positive current feedback, the transistor U2 will then apply its own base drive for normal operation.

FIG. 3 shows another embodiment which provides a dead-zone when both the power transistors U1 and U2 are turned off. If the fall time of the power transistor becomes a significant part of the power frequency half-cycle, the electrical interlock technique as described above can result in the undesired saturation of the power transformer. The reason for this is that the electrical interlock causes the saturating half-cycle of operation to lengthen at the expense of the nonsaturating half-cycle. To avoid the undesired saturation, the system of FIG. 3 provides circuitry for reverse-biasing both power transistors U1 and for a predetermined period of time before the transistor coming into conduction is driven on.

For purposes of discussion, assume that the transistor U1 is non-conductive and the transistor U2 is conductive and it is desired to turn transistor U2 off and U1 on. With the transistor U1 turned off, the transistor Q2 is also in a non-conductive state. In the normal operation of a system not including a dead band, the transistor Q2 would be turned on by base drive signal from the secondary winding W3 of the transformed TF1. In the circuit of FIG. 3, however, the magnetic coupling between the primary winding W2 of the transformer TF1 and the secondary winding W3 is made to be relatively loose so that the change in phase of the square-wave input to the winding W2 will not be seen at the secondary winding W3 until after a time delay.

The circuit for the pilot oscillator 14 is shown for supplying square-wave pulses to the primary winding W2 of the transformer TF1. The pilot oscillator 14 includes a pair of transistors Q3 and Q4 which have their collector and emitter electrodes respectively connected. The base electrodes thereof are connected to the opposite ends of a primary winding W6 of a transformer TF4. Transformer TF4 has a secondary winding W7 which has one end connected through a resistor R6 to one end of the winding W2 and the other end connected to the other end of the winding W2. A resistor R7 is connected between the base electrodes of the transistors Q3 and Q4. A source of positive potential, not shown, is applied to a terminal T5 at the collector electrodes of transistors Q3 and Q4. The emitter-electrodes of the transistors Q3 and Q4 are connected to a center tap of the primary winding W6. The transistors Q3 and Q4 operate to be conductive in opposite half-cycles so as to function in an oscillatory mode. The transformer TF4 has a square loop core and provides a square-wave output at the secondary winding W7 to be applied to the primary winding W2 of the transformer TF1. The emitter-electrodes of the transistors Q3 and Q4 are connected through a resistor R8 to the base electrode of the transistor Q1 and also through a resistor R9 to the base electrode of the transistor Q2.

As previously mentioned the coupling between the windings W2 and W3 of the transformer TF1 is relatively loose so that there is some time delay after the switching of the transistors Q3 and Q4 until this change of phase appears at the secondary winding W3. However, the base electrodes of the transistors Q1 and Q2 are connected in the primary circuit of the pilot oscillator 14 and immediately have applied thereto base drive through the respective resistors R8 and R9 as soon as the change of switched state of the transistors Q3 and Q4 takes place. Thus, at the instant of the switching of the transisors Q3 and Q4, both of the transistors Q1 and Q2 are turned on with base drive being supplied from the positive terminal T5, the collector-emitter circuit of either of the transistors Q3 or Q4, to the resistors R8 and R9, and the base electrodes of the transistors Q1 and Q2. With both transistors Q1 and Q2 conductive, the shorting loops L1 and L2 are both established. The shorting loop L1 includes the diode D2, the winding N10 and the collector-emitter circuit of the transistor Q1. The shorting loop L2 includes the diode D2, the winding N7 and the collector-emitter circuit of the transistor Q2. Thus, a voltage will be induced in the winding N4 to tend to turn off the power transistor U2 and in the winding N2 to tend to turn off the power transistor U1. The transistor U1 being at this time in its non-conductive state will remain so that the transistor U2 will be turned off according to the shorted base and reverse-biasing of the biasing circuit including the capacitor C1 as previously explained. The time period during which both the transistors U1 and U2 are maintained in their non-conductive state may be selected according to the particular design desired and may be of the order of 20 to 30 microseconds.

When the phase reversal of the pilot oscillator is seen at the secondary W3 of the transformer TF1 base drive is provided to the transistor Q2 to maintain this transistor conductive while the transistor Q1 is turned off. The turning off of transistor Q1 opens the shorting loop L1. The decay of collector current in the transistor U2 being turned off causes the diode D2, which is connected between the emitters of the transistors Q1 and Q2 and the undotted ends of the windings N7 and N10, to block. A reset current path is thus provided from the terminal T3, through the resistor R4, the winding N7, and the collector-emitter circuit of the transistor Q2 to reset the magnetic state of the transformer $TF2_2$. Also, initiating base drive is supplied to the transistor U1 from the winding N9, which is energized from the terminal T3, the resistor R5, the winding N9 and the collector-emitter circuit of the transistor Q2. Base drive is thus provided of the proper polarity to the winding N2 which turns on the transistor U1. After this initiating drive, positive current feedback from the winding N1 brings the transistor U1 up to proper collector current operating level. The transistor U2 is maintained in its non-conductive state due to the polarity of the voltage applied to base-emitter electrodes thereof.

The circuit is now in condition for the next half-cycle of operation when the transistor U1 is to be turned off and the transistor U2 is to be turned on. The sequence of operation is the converse of that previously defined. Briefly, at the phase reversal of the pilot oscillator 14, both transistors Q1 and Q2 are turned on, which causes the transistors U1 to be turned off and the transistor U2 to be maintained in its non-conductive state for a predetermined length of time. After the predetermined length of time, the transistor Q1 is turned on and the transistor Q2 is turned off with the sequence of operations as previously explained being performed to turn the transistor U2 on and maintain the transistor U1 off.

A diode D3 is connected between the base and emitter electrodes of the transistor Q1 with the cathode thereof connected to the base of the transistor Q1. A diode D4 is connected from cathode to anode between the emitter and base electrodes of the transistor Q2. Diodes D3 and D4 are used to protect the base-emitter junctions of the respective transistors from damage due to overvoltage conditions.

A diode D5 is employed in FIG. 3 with its cathode-electrode connected to the junction point between the resistors R8 and R9. A terminal T6 is connected to the anode of the diode D5. In order to shut down the inverter apparatus, a positive polarity voltage is applied to the terminal T6 with respect to ground which applies positive voltage to the base electrodes of the transistors Q1 and Q2 to render both of these conductive and thereby render non-conductive the power transistors U1 and U2, thus shutting down the output of the inverter apparatus.

It should be noted that the continued application of base drive to the transistor Q1 where it has previously been conductive during the dead band time prevents a spike voltage from being induced in the collector circuit of the transistor Q1 which upon being turned off would be transformed to the base drive winding N2 and tend to turn on the previously nonconductive power transistor U1.

The circuit as shown in FIG. 3 thus adapts itself to use with transistors which have relatively long fall times which would tend to cause saturation of the power transformer due to extended conduction during the saturation portion of the operating cycle. However, if the fall time is relatively short, as is the case with high frequency transistors, the electrical interlock system as described with references to FIGS. 1 and 2 performs without the possibility of magnetic saturation problems.

Although the present invention has been described with a certain degree of particularity, it should be understood that the present disclosure has been made only by way of example and that numerous changes in the details of circuitry, and the combination and arrangement of elements and components can be resorted to without departing from the spirit and the scope of the present invention.

What is claimed is:

1. In power inverter apparatus, the combination of:
    a power stage including
        a pair of power switching devices operatively connected for alternately supplying the output of said apparatus, and
        a biasing circuit including a storage element operatively connected to said pair of power switching devices;
    a steering circuit including
        a pair of steering switching devices operatively connected to be alternately conductive, and
        a unidirectional device operatively connected in a common circuit path with both of said pair of steering switching devices;
    transforming means coupling said power stage and said steering stage,
    said transforming means including
        power windings operatively connected to said pair of power switching devices, and
        steering windings operatively connected to said pair of steering switching devices; and
        a pilot circuit for supplying signals to said pair of steering switching devices to switch the conductive state thereof;
    when the conductive state of said pair of steering switching devices is changed a conductive path being provided through one of said steering devices, one of said steering windings and said unidirectional device to instigate non-conduction of the previously conductive one of said pair of power switching devices through the coupling of said power windings,
    said biasing circuit reverse biasing the previously conductive power switching device to complete non-conduction thereof,
    the other of said pair of power switching devices being maintained non-conductive by the current flow in the one of said pair of power switching devices until this current flow drops to a value to permit said steering circuit to provide turn-on drive through said steering and power windings to render said other of said pair of power transistors conductive.

2. In the combination of claim 1 wherein:
    said biasing circuit including a diode, and
    said storage element including a capacitor device, with said diode being connected across said capacitive device to establish the charge voltage thereon for reverse biasing said power switching devices.

3. In the combination of claim 2 wherein:
    said pair of power switching devices comprise power transistors having a plurality of electrodes, and
    said power windings include for each of said power transistors
    a drive winding operatively connected to one of said electrodes for supplying drive current to each of said power transistors and
    a feedback winding connected to another of said electrodes for receiving the output current of the respective of said pair of power transistors and being inductively coupled to said drive winding to supply positive feedback thereto to supply base drive to the respective of said pair of power transistors.

4. In the combination of claim 3 wherein:
    said pair of steering switching devices comprise steering transistors,
    said steering circuit further including a DC source operatively connected to said steering windings,
    said conductive path through one of said steering transistors, one of said steering windings and said unidirectional device being opened when said current flow in one of said power transistors drops below a level so that said unidirectional device blocks forward current flow therethrough to permit initiating turn-on drive to be supplied to said other of said power transistors by the energization of said one of said windings from said D.C. source.

5. In the combination of claim 3 wherein:
    said transformer means including a pair of transformers having separate cores,
    each of said transformers including a first and a second of said steering windings and one of said drive and said feedback windings,
    said first of said steering windings operatively connected to said D.C. source to reset the core of one of said pair of transformers and
    said second of said steering windings operatively connected to said D.C. source to receive energization therefrom to instigate turn-on of the desired power transistor through the associated of said drive windings.

6. In the combination of claim 5 wherein:
    said unidirectional device comprises a diode.

7. In the combination of claim 6 wherein:
    said undirectional device comprises a balanced transistor having base, collector and emitter electrodes, each of said conductive paths being provided through the base-collector circuit of said balanced transistor and the respective steering winding and steering transistor.

8. In the combination of claim 3 including:
    a power transformer operatively connected to each of said power transistors to receive the output thereof;
    an operating DC source operatively connected between said power transformer and said pair of power transistors; and
    a Zener diode operatively connected between each of said pair of power transistors and said operating DC source to provide a current path back to said operating DC source when a reactive load is to be supplied by said inverter apparatus.

9. In the combination of claim 5 including:
    a pilot transformer including a primary winding and a secondary winding,
    said pilot circuit including a pilot oscillator operatively connected to said primary winding so that said signals are provided at said secondary winding,
    said primary and secondary windings being relatively loosely coupled so that there is a time delay between the time a change of phase appears at said primary winding in response to said pilot oscillator and the time this change of phase appears at said secondary winding; and means connecting said steering transistors to said pilot oscillator at the primary side of said pilot oscillator to turn on both of said steering transistors in response to a change of phase of said pilot oscillator, with both of said transistors being maintained non-conductive for a predetermined length of time determined by the time delay between said primary and secondary windings so as to prevent undesired magnetic saturation in said apparatus.

References Cited

UNITED STATES PATENTS

| | | | |
|---|---|---|---|
| 3,119,058 | 1/1964 | Genuit | 321—45 |
| 3,305,757 | 2/1967 | Schlabach et al. | 321—45 XR |
| 3,305,761 | 2/1967 | Heinrich et al. | 321—45 |
| 3,317,815 | 5/1967 | Merritt | 321—45 |

LEE T. HIX, *Primary Examiner.*

W. SHOOP, *Assistant Examiner.*